Feb. 10, 1948.　　　M. W. AMBROSE　　　2,435,815
WELDING APPARATUS
Filed Aug. 31, 1945　　　2 Sheets-Sheet 2
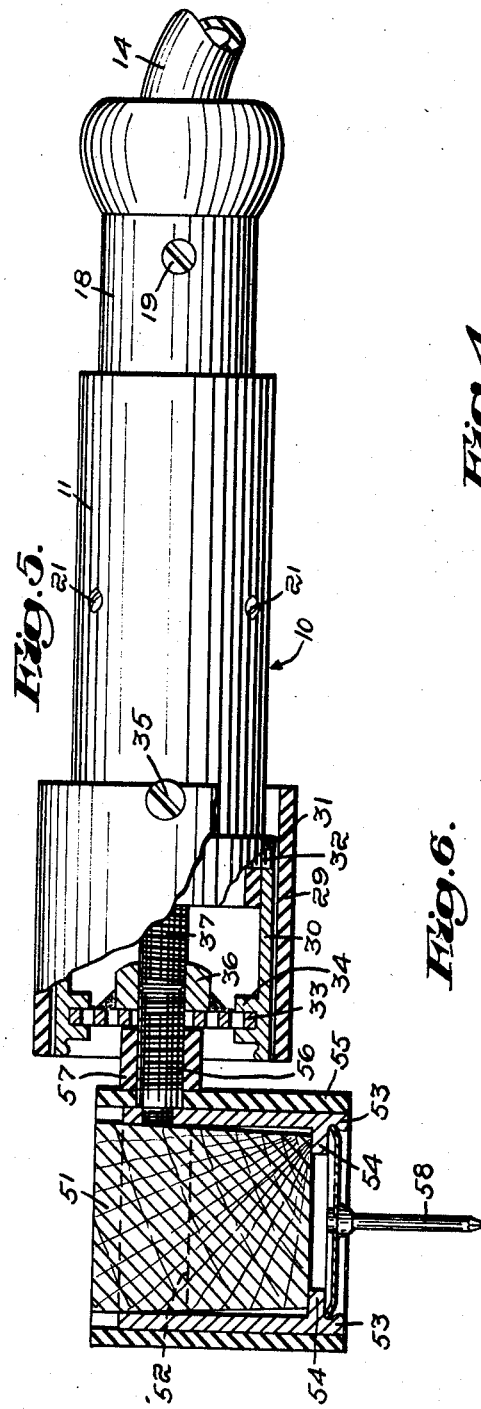
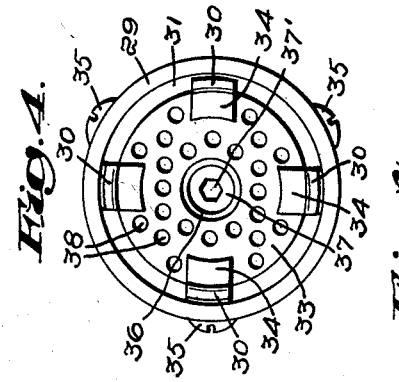
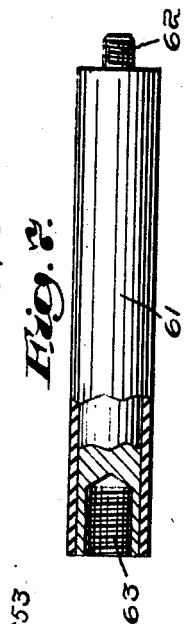
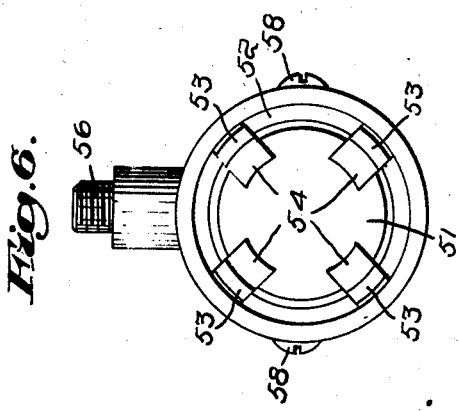
Inventor:
Merrill W. Ambrose,
by Thomson + Thomson
Attorneys Patented Feb. 10, 1948

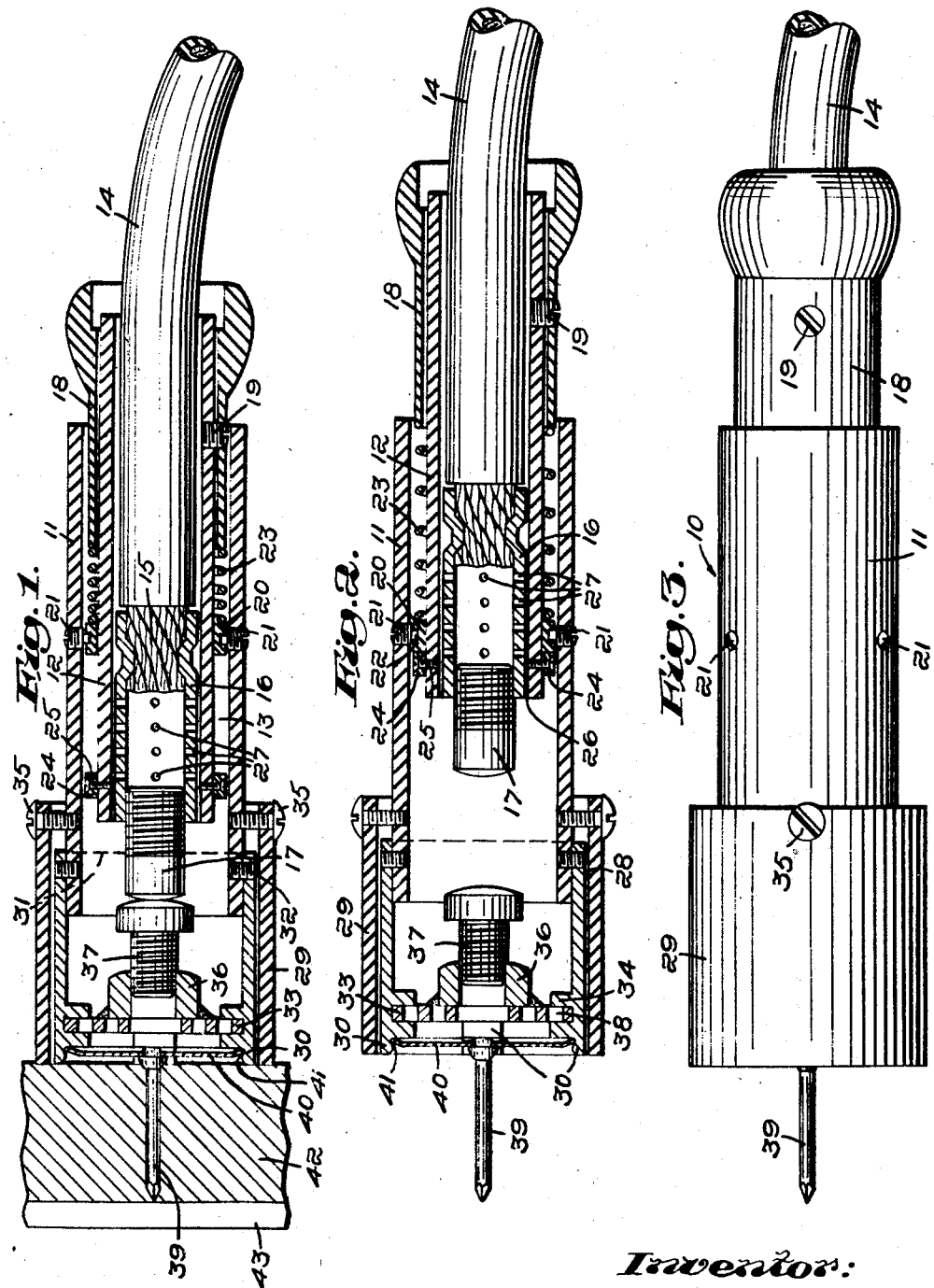

2,435,815

UNITED STATES PATENT OFFICE 2,435,815

WELDING APPARATUS

Merrill W. Ambrose, Roxbury, Mass.

Application August 31, 1945, Serial No. 613,892

8 Claims. (Cl. 219—4)

This invention relates to welding apparatus of the type commonly employed for flash welding nails or small studs to the steel walls of a ship or other structure, to provide fastenings for securing sheets of insulating material to the walls or plates of the structure.

In this type of welding, a nail or stud removably held in the head of the device is forced through the insulation until its tip contacts the underlying metal plate or wall, thereby completing the welding circuit; the nail is withdrawn to create an arc between its tip and the plate; the nail end is next pressed into the crater formed in the plate by the arc, and held in contact momentarily to complete the weld; and the welding circuit is then broken and the device withdrawn from the welded nail.

In my copending application Serial No. 556,041, filed September 27, 1944, now abandoned, I have described a simple, compact, efficient and handy welding device, suitable for use with the plain type of nail or with the disc-headed type of nail or stud, in which relatively movable contacts are disposed within the body of the device so that the welding circuit is broken on the separation of said contacts and the resulting flash is effectively masked by the body or casing of the device.

The subject matter of the present application is an improvement upon that disclosed in my prior application, and the principal purpose of this invention is to provide a welding device in which the electrode element and other parts of the mechanism are so constructed and arranged with relation to each other as to provide vents and draft openings through which the heat generated by the welding operation or by the flash on the opening of the contacts, is rapidly dissipated. This arrangement prevents overheating of the casing and permits the operator to perform numerous successive welding operations without discomfort or delay.

Further objects of the present invention reside in the improved features of the apparatus herein described in connection with the accompanying drawings showing recommended embodiments of the invention, and these features will be pointed out in the appended claims. It will be understood, however, that the structural details of the devices herein illustrated and described may be varied to suit particular purposes or conditions without departing from the essence of the invention as set forth in the claims. In the drawings, Fig. 1 is a longitudinal section of the improved welding apparatus in operative position with the contacts of the welding circuit closed, showing a headed nail carried by the device and inserted through the insulation to engage the underlying plate;

Fig. 2 is a similar view showing the device in inoperative position, with the contacts open;

Fig. 3 is a side elevation of the apparatus as shown in Fig. 2;

Fig. 4 is a view of the forward end of the device, with the headed nail removed therefrom;

Fig. 5 is a side elevation of the device equipped with an attachment for holding a headed nail at right angles to the main body of the apparatus, the attachment being shown in section and a portion of the casing of the main body being broken away;

Fig. 6 is an end view of the attachment looking to the left of Fig. 5, with the headed nail removed;

Fig. 7 is a side view, partly broken away, of an optional extension rod attachment; and Fig. 8 is a broken side view of a nipple attachment adapted for connection to the extension rod or to the head of the device, for holding a plain nail.

In the form shown in Figs. 1 to 3, the welding apparatus comprises a cylindrical body 10 having concentric, telescoping sleeves 11 and 12 made of fibreboard or other insulating material and separated from each other by a space 13 which provides a ventilating passage. The inner shell or tube 12 loosely receives the covered cable 14 of the welding circuit, and the end 15 of the cable or wire is swaged within a tubular conductor 16 which carries a contact member 17 removably threaded in its outer end.

A tubular hand grip 18 fits loosely around the outer end of the tube 12 and is fixed relative thereto by one or more fibre screws 19 or other fastenings; and a collar 20 fits loosely around said tube in the space 13, and is fixed in spaced relation to the sleeve 11 by fibre screws 21 threaded in the sleeve and engaging in an annular groove 22 of the collar. A coiled compression spring 23 surrounds the tube 12 between the inner end of the grip 18 and the collar 20, and presses the tube outwardly of the sleeve 11. Outward movement of the tube is limited by a tin ring 24 fastened to its inner end, as by screws 25, the ring engaging the collar 20 in the outermost or inoperative position of the telescoping members, as shown in Fig. 2.

The screws 25 which hold the stop ring in place on the tube 12, also engage and secure the conductor 16 in place within the tube. It will be observed that the conductor is spaced radially from the tube at 26 and is provided with radial apertures 27. Heat or gases generated within the conductor will thus be liberated through the vents 26 and 27, and be dissipated through the chamber 28 of the sleeve 11 and the passageway 13, or through the ventilating passage 26 and between the tube 12 and the wire 14 which is loosely received therein.

The forward end of the sleeve 1 carries an outer tubular shield 29 of insulating material, and an inner nail holder comprising a plurality of resilient steel fingers 30 projecting outwardly from a ring or band 31 (Figs. 4 and 5) fastened to the end of the sleeve by headless screws 32. A perforated steel plate 33 is mounted across the forward end of the device, preferably in sockets 34 formed on said fingers. The shield 29 surrounds and encloses the nail holding elements, and is fastened to the sleeve by screws 35. The shield 29 and sleeve 11 confine and mask the flash occurring when the contacts of the device are separated as hereafter explained.

The end plate 33 has an internally threaded boss 36 welded or otherwise attached to its inner side behind a large central opening thereof, and a contact member such as the bolt 37 is screwed into the boss in operative alignment with the contact 17. The perforations 38 of the plate serve as vent openings for rapidly dissipating heat from the chamber 28. The position of the bolt 37 may be adjusted by an Allen wrench inserted through the central opening of the plate 36 and into a socket 37' in the outer end of the bolt, if desired (Fig. 4).

The welding device is designed primarily for use with the headed nails shown in Figs. 1 to 3 which comprise a pin 39 and a disc 40 attached to its outer end in the nature of a large, thin head. The disc 40 snaps into recesses 41 of the spring fingers 30 and is removably retained thereby until the weld is completed and the device is retracted to free the disc from the grip of the fingers. The nail is electrically connected to contact 37 through the fingers 30, plate 33 and boss 36.

With the welding nail thus attached and the lead wire 14 connected to the welding circuit—for example, a circuit supplying from 75 to 200 amperes at 60 to 70 volts according to the size or nature of the welding nail or stud—the apparatus is operated by grasping the shield 29 and/or sleeve 11 in one hand and the grip 18 in the other, pressing the grip and the tube 12 inwardly to compress spring 23 and engage the contacts 17 and 37, and then forcing the nail 39 through the insulation 42 until its tip meets the steel plate or wall 43 to complete the welding circuit. The device is next manually retracted to draw an arc between the nail tip and plate, and then pushed forward again to seat the nail in the softened crater of the plate and effect the weld. Finally the device is removed by freeing or pulling back the hand grip 18, thereby separating the contacts 17 and 37 to break the circuit, and retracted immediately thereafter to detach the fingers 30 from the disc head of the welded nail. The flash caused by breaking the circuit within the body of the device is shielded from the eyes of the operator, and excessive heat is vented and dissipated, as aforesaid.

Where working space does not permit the device to be conveniently operated with the nail mounted axially in the head, as in Figs. 1 to 3, an attachment such as the auxiliary, offset head shown in Figs. 5 and 6 is preferably utilized. The attachment comprises a tapered core 51 of hard wood or the like; a band 52 embracing the core and carrying spring fingers 53, corresponding to the fingers 30 of the main body 10 of the device, but each having only one upwardly projecting lug which hooks over the end of the core; an outer casing 55 of insulating material; and a laterally projecting, threaded conductor stud 56 screwed in the band 52 and partially enclosed by an insulating cover 57. The parts of the attachment are held in assembled position by screws 58 passing through the casing 55 and band 52 and into core 51.

The attachment is removably mounted on the welding head by inserting the conductor through the central opening of the plate 33 and threading it into the boss 36 until it meets the contact 37. The headed nail 58 is retained by the spring fingers as previously described and projects at right angles to the axis of the cylindrical body 10.

For reaching through narrow openings, an insulated extension rod 61 (Fig. 7) may be utilized. This rod may be of any desired length and has a threaded stud 62 at one end to fit into the boss 36 of the body 10, and an internally threaded bore 63 at its opposite end. The bore is adapted to receive the conductor 56 of the offset attachment of Figs. 5 and 6, or a conductor axially mounted in a similar attachment. The bore 63 will also receive a nipple attachment 64 (Fig. 8) having an axial hole 65 in its outer end to hold a plain nail, and the nipple is also adapted to fit the bore of boss 36, so that the main device may be used in welding plain nails.

These attachments or auxiliary devices contribute to the useful flexibility of the welding apparatus shown in Figs. 1 to 3, and may be quickly connected thereto without special tools or fittings; for the boss 36 serves as a convenient coupling element for the attachments as well as a holder for the contact 37.

A nail welding device of the character described is compact and readily portable, economical to manufacture and assemble, easy to handle, efficient in operation, and durable in use. The ventilated body provides draft passages between all the elements which would otherwise confine heat and pressure, and thus ensures increased life of the contacts; but it is apparent that the latter may be quickly replaced when they become unserviceable, and any other parts may be easily serviced.

I claim:

1. A welding device of the character described, comprising a substantially cylindrical body having a sleeve, a tube telescoping within one end of the sleeve and a head shield attached to the outer end of the sleeve, the tube being spaced radially from the sleeve to provide a ventilating passageway therebetween, a spring surrounding the tube within the sleeve, means mounted on the sleeve and tube respectively for confining the ends of the spring while permitting relative longitudinal movement of said members, means limiting outward movement of the tube relative to the sleeve, a conductor fixed concentrically within the tube in radially spaced relation thereto to provide a ventilating passageway therebetween, means located within said head shield for holding a welding nail, and a contact disposed axially within the head and electrically connected to said holding means, said conductor having a contact member engaging said first contact when the tube and sleeve are telescoped together.

2. A welding device of the character described, comprising a substantially cylindrical body having a sleeve, a tube telescoping within one end of the sleeve and a head shield attached to the outer end of the sleeve, the tube being spaced radially from the sleeve to provide a ventilating passageway therebetween, a spring surrounding the tube within the sleeve, means mounted on the sleeve and tube respectively for confining the ends of the spring while permitting relative longitudinal movement of said members, means limiting outward movement of the tube relative to the sleeve, a conductor fixed concentrically within the tube in radially spaced relation thereto to provide a ventilating passageway therebetween, means located within said head shield for holding a welding nail, and a contact disposed axially within the head and electrically connected to said holding means, said conductor having a contact member engaging said first contact when the tube and sleeve are telescoped together, said conductor having a tubular portion provided with vent apertures in its wall, said apertures communicating with the passageway between the conductor and tube.

3. A welding device of the character described, comprising a substantially cylindrical body having a sleeve, a tube telescoping within one end of the sleeve and a head shield attached to the outer end of the sleeve, the tube being spaced radially from the sleeve to provide a ventilating passageway therebetween, a spring surrounding the tube within the sleeve, means mounted on the sleeve and tube respectively for confining the ends of the spring while permitting relative longitudinal movement of said members, means limiting outward movement of the tube relative to the sleeve, a conductor fixed concentrically within the tube in radially spaced relation thereto to provide a ventilating passageway therebetween, means located within said head shield for holding a welding nail, and a contact disposed axially within the head and electrically connected to said holding means, said conductor having a contact member engaging said first contact when the tube and sleeve are telescoped together, the means limiting outward movement of the tube including a band embracing the tube and fastenings passing through said band and tube and engaging said conductor.

4. A welding device of the character described, comprising a substantially cylindrical body having a sleeve, a tube telescoping within one end of the sleeve and a head shield attached to the outer end of the sleeve, the tube being spaced radially from the sleeve to provide a ventilating passageway therebetween, a spring surrounding the tube within the sleeve, means mounted on the sleeve and tube respectively for confining the ends of the spring while permitting relative longitudinal movement of said members, means limiting outward movement of the tube relative to the sleeve, a conductor fixed concentrically within the tube in radially spaced relation thereto to provide a ventilating passageway therebetween, means located within said head shield for holding a welding nail, and a contact disposed axially within the head and electrically connected to said holding means, said conductor having a contact member engaging said first contact when the tube and sleeve are telescoped together, the means for confining the spring including a hand grip loosely embracing the outer end of the tube and secured thereto, a collar loosely surrounding the tube, and fastenings extending through the sleeve and engaging the collar to prevent its longitudinal movement relative to the sleeve.

5. A welding device of the character described, comprising a substantially cylindrical body having a sleeve, a tube telescoping within one end of the sleeve and a head shield attached to the outer end of the sleeve, the tube being spaced radially from the sleeve to provide a ventilating passageway therebetween, a spring surrounding the tube within the sleeve, means mounted on the sleeve and tube respectively for confining the ends of the spring while permitting relative longitudinal movement of said members, means limiting outward movement of the tube relative to the sleeve, a conductor fixed concentrically within the tube in radially spaced relation thereto to provide a ventilating passageway therebetween, means located within said head shield for holding a welding nail, and a contact disposed axially within the head and electrically connected to said holding means, said conductor having a contact member engaging said first contact when the tube and sleeve are telescoped together, the means for holding the welding nail including a band fixed on the end of the sleeve and having outwardly projecting, resilient fingers for gripping the disc of a headed nail, and a perforated plate fixed between said fingers radially of the head casing, said plate having an axial boss removably receiving said first contact.

6. A welding device of the character described, comprising a sleeve, a tube telescoping within one end of the sleeve, a cable and conductor located in the tube, the conductor having an axially directed contact member, a second contact member axially mounted adjacent the opposite end of the sleeve, compressible means yieldingly urging the tube outwardly of the sleeve but permitting inward movement thereof so that the contacts are engaged only when the tube is manually pressed into the sleeve, and means connected to the second contact for releasably holding a welding nail, there being ventilating, longitudinal passageways between the shell and the tube and between the tube and the conductor and cable, said passageways extending the entire length of said tube and leading to the respective ends of the welding device.

7. A welding device of the character described, comprising a sleeve, a tube telescoping within one end of the sleeve, a cable and conductor located in the tube, the conductor having an axially directed contact member, a second contact member axially mounted adjacent the opposite end of the sleeve, compressible means yieldingly urging the tube outwardly of the sleeve but permitting inward movement thereof so that the contacts are engaged only when the tube is manually pressed into the sleeve, and means connected to the second contact for releasably holding a welding nail, there being ventilating, longitudinal passageways between the shell and the tube and between the tube and the conductor and cable, said passageways extending the entire length of said tube and leading to the respective ends of the welding device, and a transverse plate having means receiving and retaining said second contact, said plate having a plurality of ventilating apertures therethrough.

8. A welding device of the character described, comprising a sleeve, a tube telescoping within one end of the sleeve, a cable and conductor located in the tube, the conductor having an axially directed contact member, a second contact member axially mounted adjacent the opposite end of the sleeve, compressible means yieldingly urging the tube outwardly of the sleeve but permitting inward movement thereof so that the contacts are engaged only when the tube is manually pressed into the sleeve, and means connected to the second contact for releasably holding a welding nail, there being ventilating, longitudinal passageways between the shell and the tube and between the tube and the conductor and cable, said passageways extending the entire length of said tube and leading to the respective ends of the welding device, a portion of said conductor being tubular and the tubular wall having ventilating openings therethrough.

MERRILL W. AMBROSE.

REFERENCES CITED

The following references are of record in the file of this patent:

UNITED STATES PATENTS

| Number | Name | Date |
|---|---|---|
| 1,238,206 | Shuler | Aug. 28, 1917 |
| 2,378,720 | Nelson | June 19, 1945 |
| 2,379,645 | Morris | July 3, 1945 |